June 9, 1964 W. BALLMER 3,136,832
METHOD OF MANUFACTURING A FOAMED-RUBBER ARTICLE
Filed Aug. 9, 1960
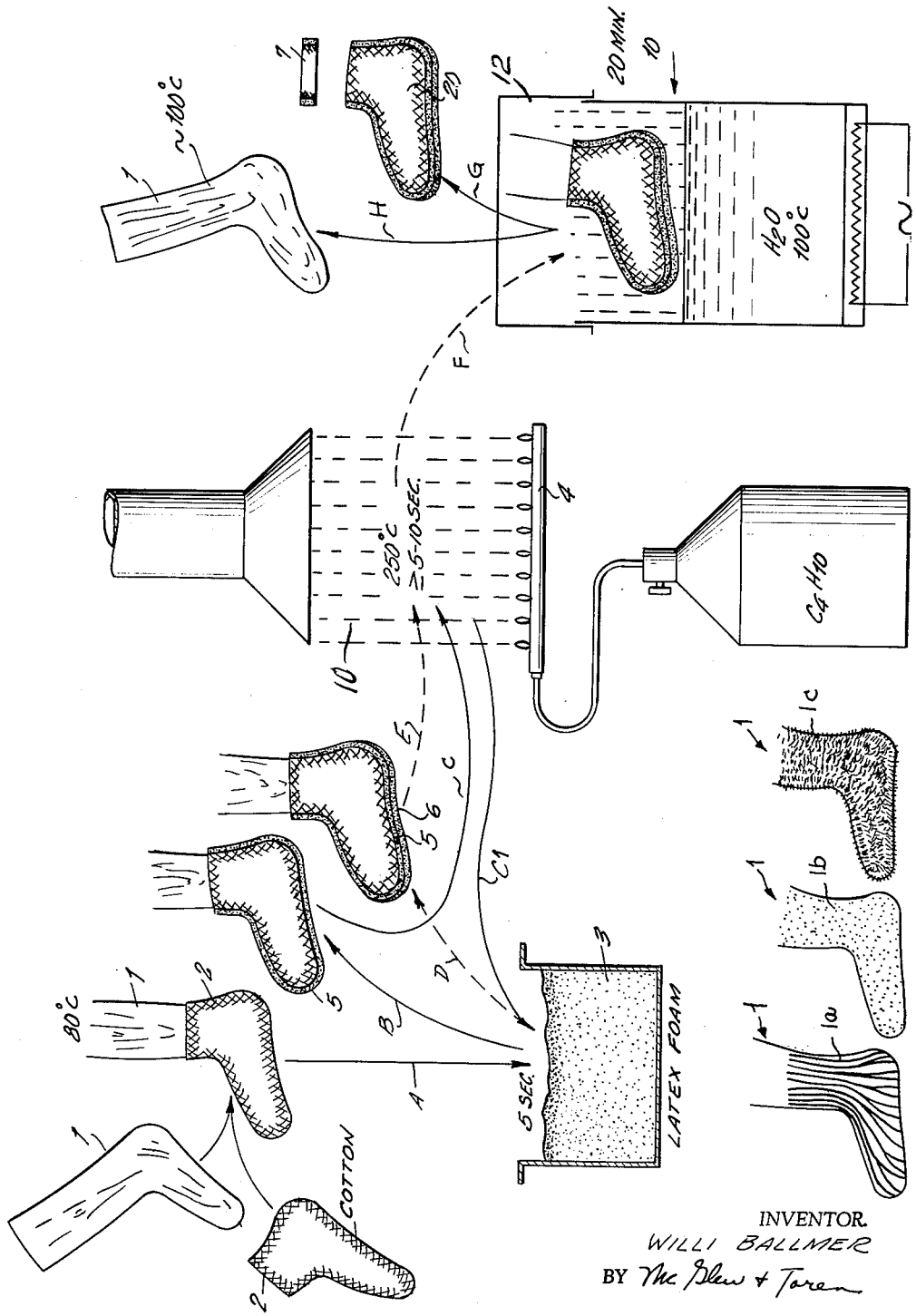
INVENTOR.
WILLI BALLMER

United States Patent Office 3,136,832
Patented June 9, 1964

3,136,832
METHOD OF MANUFACTURING A FOAMED-RUBBER ARTICLE
Willi Ballmer, Zurich, Switzerland, assignor to Fritz Sandmeier, Zurich, Switzerland
Filed Aug. 9, 1960, Ser. No. 48,353
Claims priority, application Austria Aug. 22, 1959
10 Claims. (Cl. 264—255)

The present invention relates to a method of manufacturing an article consisting at least in part of foamed rubber, said method comprising the steps of immerging a carrier into a bath of rubber latex foam, extracting it from the said bath, and gelling and thereafter vulcanizing the latex foam which has adhered to the carrier.

The said carrier may be a form from which the article is stripped after vulcanization of the latex foam, or it may comprise, in addition to a form, a covering which is to become part of the article.

The obtention of articles consisting wholly or in part of foamed rubber, by immerging a form into a bath of rubber latex foam, offers much more difficulties than the well-known method of obtaining a non-porous skin of natural or synthetic rubber by immerging a hot form into a non-foamed, liquid latex mixture. Due to the comparative instability of the latex foam, its low thermal conductivity, and the impossibility of operating at such a speed that the foam structure in the vicinity of the immerged form is not modified before gelling occurs, the presence of air bubbles of some size in the foam results in the formation of undesirable deep pits in the surface of the foamed rubber layer.

It has already been suggested to use a cold form for immersion into the latex bath and to transfer this form into a hot atmosphere, preferably containing acid vapors, or into a high-frequency field, or into both, in order to produce gelling of the latex foam layer formed on the form, whereupon the whole is heated to vulcanizing temperature. Thus, gelling of the latex foam is not produced before the foam has been formed into a thin layer which becomes gelled immediately it is heated and without its structure being affected.

With this method, the time elapsing from the moment at which the form is immerged into the bath to the moment at which it is transferred into the hot atmosphere or into the high frequency field, is not usefully employed for gelling the latex foam. A still more important loss of time results from the fact that each form, after having been heated to vulcanizing temperature, must be cooled down again before it can be immerged again into the latex foam bath. Therefore, a great number of similar forms must be used in turn to prevent the rate of production to be impaired by that necessary cooling period of each form.

The present invention has for its general object to avoid these drawbacks.

More specifically, it is one of the objects of the invention to provide a method whereby it is possible to start gelling of the latex foam already before the form is withdrawn from the latex foam bath.

Another object of the invention is to provide a method in which the form need not be cooled below gelling temperature of the latex foam before it can be immerged again into the latex foam bath.

A further object of the invention is to provide means whereby a lining can be incorporated into the article in the very process of producing the latter.

Further objects and advantages of the invention will become apparent from the description, now to follow, of various modes of performing and applying the method of the invention.

In the drawing, there is illustrated a generalized flow sheet showing the various steps of the method according to the present invention of manufacturing an article comprising foamed-rubber.

In general terms, the method of the invention comprises the steps of immerging into a bath 3 of rubber latex foam a carrier generally designated 1 through which or along the surface of which gas escape passages are provided, said carrier 1 having previously been heated at least to the gelling temperature of the rubber latex, withdrawing the carrier 1 from the bath 3, exposing it at once to the action of heat and/or an acid atmosphere until the rubber latex foam adhering to the carrier has been completely gelled, and heating the coated carrier to vulcanizing temperature in a vulcanizing atmosphere 10.

According to the requirements of the article to be produced, the carrier 1 can have different shapes and be of different construction.

In a first mode of performing the invention which is particularly suitable for the manufacture of footwear such as slippers or moccasins, the carrier may consist of a solid, preferably impervious form 1 with a gas-permeable covering. The form itself could be made from metal, porcelain, glass, wood, plastics, etc. It is preferable that it comprises a material of substantial specific heat. For instance, a hollow metal form filled with water is particularly advantageous.

The gas-permeable covering may consist of a sock 2 knitted from wool, cotton, silk, nylon, etc. and be suitable for constituting the lining of the footwear which is to be obtained. As an alternative, the gas-permeable covering could have been produced on the form itself as a felt or fleece of fibers such as is indicated at 1c, before the form is immerged into the latex foam bath. Such a felt or fleece 1c could be produced by spraying onto the form an emulsion of synthetic resin, for instance an aqueous emulsion of polyvinyl acetate, acting as a binder, and containing textile fibers or comminuted leather chips and shavings. However, the synthetic resin acting as a binder should only be used sparingly to preserve the permeability of the felt or fleece.

According to a second mode of performing the invention, a solid impervious form of the same material as indicated above could be used without any covering, this form being engraved in its surface with a great number fine grooves 1a. Preferably, the majority of these grooves 1a should run upwards as steeply as possible and at little distance from each other along those lines along which the latex foam is displaced when the form is being immerged in the bath. Additional grooves may be provided crosswise of these lines and with wider spacing. The individual grooves 1a preferably should be very narrow to prevent the latex foam bubbles from entering them, but rather deep so as to provide a sufficient cross-section for evacuating any gases expelled from the latex foam which becomes heated by the form.

According to a third mode of performing the invention, one uses a solid form made from porous permeable material with pores 1b in which the total cross-section of the pores amounts to about 30 to 40 percent of the total of any considered cross-section. This material may be, for instance, porous hard rubber obtained by casting from latex foam, or iron powders sintered by means of tin dust, or iron powder bonded by means of synthetic resin of the epoxy or polyester type.

In performing the method of the invention, the carrier 1 prepared as indicated in connection with one of the three above-mentioned modes is heated up to more than the gelling temperature of the latex foam, e.g. to 60 to 80° C., and then immerged (arrow A) into the bath 3 of latex foam. Due to the temperature of the carrier 1, the latex foam begins to be converted into gel within the bath 3 immediately along the surface 5 of the carrier. The air which simultaneously is expelled from the layers of the bath adjacent the carrier can easily escape, according to the nature of the carrier employed, through the fiber intervals 1c of the fabric, felt, fleece, or other gas-permeable covering, or through the fine, deep grooves 1a of the form surface along the latter upwards, or through the pores 1b of the permeable form 1, respectively. Thus, this air does not accumulate within the latex foam layer 5 and does not destroy its structure. On the outer side of the gelling latex foam layer, the foam structure does not break down either, nor does the latex foam collapse, develop a skin or become pitted, since it is surrounded by ungelled, unheated latex foam.

After the carrier 1 has been extracted (arrow B) from the latex foam bath 3, the formation of an outer skin at the surface of the latex or the pitting of such surface is effectively prevented by immediately exposing (arrow C) the carrier and the latex layer 5 adhering to it, to external heat action of the burner 4 or to an acid atmosphere, or to both. This results, at the free surface of the latex layer, in immediate gelling of the latex, and such gelling progresses from the surface towards the already gelled portion of the layer 5 so that the latter becomes gelled through and through.

More particularly, the carrier can be transferred (arrow C) immediately on emerging from the latex foam bath 3, into acid atmosphere and thereafter into another atmosphere which has a temperature higher than the gelling temperature of the latex. Alternatively, or in addition thereto, the latex foam covered carrier 1 could be exposed to infra-red radiation, or to a high-frequency field, or to both.

According to an alternative mode of performing the invention, the carrier 1 may be transferred into a hot acid atmosphere, immediately after it has emerged from the bath 3. Shuch an atmosphere may be produced, for instance, by burning a carbonaceous fuel to carbon dioxide or to another combustion product which will form a weak acid as soon as it comes into contact with the water contained in the latex mixture. Thus, the heating and the acidification of the gelling atmosphere is effected in one and the same operation.

It is recommendable to impart to the carrier a rotation at moderate speed about a substantially horizontal axis, in order to prevent any drops of liquid latex mixture from gelling as such and to ensure that any liquid latex mixture will be distributed over the gelling foam layer 5.

After complete gelling of the latex foam layer 5 present on the carrier, the whole is heated in the atmosphere 10 in known manner to the vulcanizing temperature of the latex foam.

In those modes of carrying out the invention in which the carrier comprises a gas permeable covering such as 1b or 1c, this is now stripped from the form together with the vulcanized latex foam layer. Thus, one obtains an article made from foamed rubber and provided with a permeable lining, for instance, a slipper or other footwear which is permeable to air and which is very agreeable to wear.

In case the carrier only comprises a form without such covering, that is, if the article to be produced comprises only the vulcanized foamed rubber layer, only the latter must be stripped from the grooved or permeable form 1a. Preferably, this is done as long as the temperature of the form 1 is still above the gelling temperature of the latex foam. Then, if the form is immerged (arrow A) immediately into the latex foam bath for producing another similar article, it will be unnecessary, as a rule, to heat it up again to gelling temperature.

*Example*

For manufacturing a fabric-lined foamed-rubber slipper, one proceeds as follows.

A latex mixture is prepared by mixing:

| | Parts |
|---|---|
| 60-percent rubber latex | 168 |
| Sulphur | 1.75 |
| Tetramethyl thiuram disulphide (accelerator) | 1.25 |
| Zinc salt of mercapto benz-imidazolethiol (anti ageing agent) | 1.0 |
| Ammonium chloride | 0.25 |
| Zinc oxide | 0.25 |

(The two latter to form a complex salt producing the desired gelability.)

This latex mixture is beaten at room temperature, with conventional equipment, until it forms a foam comprising a great number of fine air bubbles of even size. The foam thus obtained is like a viscous fluid and would be suitable for casting as well.

Into that latex mixture bath 3, a last, such as 1, made from wood impregnated with a suitable synthetic resin, covered with a sock 2 of knitted cotton fabric and heated to 80° C. is immerged (arrow A) for 5 seconds and promptly but carefully withdrawn (arrow B) so that an even layer 5 of latex foam adheres to the sock 2. Due to the temperature of the last 1, this layer 5 becomes partly gelled at once.

To complete the gelling of the foam on the socks 2, the last 1 carrying it is immediately transferred (arrow C) into a heated acidified atmosphere obtained by burning of the gas mixture known under the trade name of "Butagas," containing mainly butane. The last 1 is held at some distance above the flame of burner 4, where the temperature of the combustion gases is about 250° C., for 5 to 10 seconds; this will suffice for completing the gelling of the foam layer 5. The duration of this exposure to the hot acidified atmosphere may, however, exceed that minimum.

Thereupon, the last carrying the sock with the gelled latex foam layer thereon is dipped once more (arrow C1) into the foam bath 3, this time to such an extent that only the sole portion becomes immerged a second time and a second layer 6 of latex foam is formed on it. After 5 seconds, the whole is then transferred (arrows D and E) once more for 5 to 10 seconds, or more if desired, into the said heated and acidified atmosphere to complete gelling of the second latex layer 6 on the sole.

The gelled latex coating 5, 6 thus obtained on the sock 2 is still permanently deformable and this permits treating its surface as desired. In particular, a pattern can be imprinted on the bottom surface of the sole, for instance by applying that surface onto an appropriate grid or plate. Also, the edge of the sole and its junction with the rising side of the slipper can be given a desired configuration by means of a profiled roller.

The article thus obtained is now transferred (arrow F) into the stream atmosphere above boiling water in chamber 12 at atmospheric pressure, i.e. into steam of little less than 100° C., whereby it becomes vulcanized and receives its permanent consistence. It remains for 20 minutes in this atmosphere. After that time, the last carrying the sock is withdrawn (arrow G) from the steam chamber and the sock with the vulcanized foamed rubber layer thereon is stripped (arrow H) from the last. It must only be trimmed to yield a comfortable and saleable slipper; the excess material 7 having been cut away.

The last, which has left the steam chamber at little below 100° C., may then be fitted with another sock, whereupon it will have approximately the required temperature of 80° C. to be immerged again into the latex foam mixture bath as described above.

It will be understood that the above described method and the various modes of performing it, as well as the example more specifically described, are capable of many modifications without departing from the scope of the invention.

I claim:

1. Method of manufacturing an article consisting at least in part of foamed rubber, comprising the steps of preparing a liquid rubber latex mixture foam bath, preparing a carrier having gas escape passages formed therein, heating the said carrier to a temperature exceeding the gelling temperature of the said latex mixture foam, immerging the heated carrier into the said liquid foam bath until there is formed a gelled layer of the rubber latex mixture on the surface of the carrier while a coating of the liquid foam of the mixture adheres to the surface of the gelled layer and while gas liberated from the gelled layer, while gelling, and from the liquid foam layer is vented through said gas escape passages, the gelled layer being situated between the carrier and the liquid foam coating, withdrawing the carrier with the gelled layer and adhering liquid foam coating from the foam bath, immediately exposing said carrier to a gelation promoting atmosphere so that gellation of the liquid foam coating occurs progressively from the outer surface of the liquid foam coating toward the gelled layer, heating the whole to the vulcanizing temperature of said rubber latex mixture until the said layer has been vulcanized, and removing at least part of the said carrier from the article thus obtained.

2. Method as claimed in claim 1 in which said carrier is prepared by providing a rigid form body with a removable, permeable covering, said covering being subsequently removed from the form body together with the vulcanized rubber foam layer.

3. Method as claimed in claim 2 in which said permeable covering is provided by a looped fabric.

4. Method as claimed in claim 2 in which said permeable covering is provided by spraying a liquid containing fibrous material and a binder therefor onto said solid form body.

5. Method as claimed in claim 1 in which said carrier comprises a rigid form body the surface of which is provided with fine grooves.

6. Method as claimed in claim 1 in which said carrier is a rigid body of porous material.

7. A method of producing an article made at least in part of foamed rubber, which comprises dipping a carrier having peripheral gas escape passages into a rubber latex foam bath after said carrier has been heated to at least the gelling temperature of said rubber latex foam thereby causing substantially instantaneous gellation of latex foam in contact with said carrier, withdrawing said carrier with latex foam adhering thereto from said bath, allowing liberated air from said adhering foam to escape through said gas passages, and exposing said carrier with the adhering foam upon said withdrawal to a gelation inducing atmosphere until gelling of said adhering foam has been completed.

8. A method of producing an article made at least in part of foamed rubber, which comprises dipping a carrier having gas escape passages into a rubber latex mixture foam bath after said carrier has been heated to at least the gelling temperature of said rubber latex foam thereby causing substantially instantaneous gelation of latex foam in contact with said carrier, withdrawing said carrier with latex foam adhering thereto from the bath, allowing gas entrapped within said foam to escape through said passages, exposing said carrier with latex foam adhering thereto immediately upon said withdrawal to a gelation inducing atmosphere until gelling of said adhering latex foam has been completed, vulcanizing said gelled rubber latex foam, and removing at least part of said carrier.

9. A method of making an article which is comprised of foam ruber comprising the steps of: preparing a liquid foam bath of a rubber latex mixture containing a gas; covering the surface of a forming device with a permeable cover, which permeable cover comprises a lining for the article when finished, the permeable cover and the interface between the cover and the surface of the forming device defining gas venting spaces; preheating the covered forming device to a temperature at least equal to the gelling temperature of the liquid foam bath; immerging the preheated covered forming device into the liquid foam bath until there is formed a gelled layer of the rubber latex mixture on the covered surface of the forming device while a coating of the liquid foam of the mixture adheres to the surface of the gelled layer and while gas liberated from the gelled layer while gelling and from the liquid foam layer is vented through gas venting spaces, said gelled layer being situated between the coated forming device and the liquid foam coating; withdrawing the covered forming device with the gelled layer and adhering liquid foam coating from the bath; exposing the withdrawn forming device to a gellation promoting atmosphere so that gellation of the liquid foam coating occurs progressively from the outer surface of the liquid foam coating toward the gelled layer; heating the forming device and its gelled layer and gelled coating until said layer and coating are vulcanized; and, removing at least part of the forming device from the article thus obtained.

10. The method according to claim 9, wherein said withdrawn forming device is rotated while being exposed to the gellation promoting atmosphere.

References Cited in the file of this patent

UNITED STATES PATENTS

| | | |
|---|---|---|
| 1,592,536 | O'Neill | July 13, 1926 |
| 1,871,364 | Gibbons | Aug. 9, 1932 |
| 2,078,913 | Strickhouser et al. | Apr. 27, 1937 |
| 2,106,808 | Murphy et al. | Feb. 1, 1938 |
| 2,169,847 | Murphy et al. | Aug. 15, 1939 |
| 2,206,757 | Talalay | July 2, 1940 |
| 2,273,995 | Rogerson et al. | Feb. 24, 1942 |
| 2,315,283 | Thompson | Mar. 30, 1943 |
| 2,384,056 | Tritt | Sept. 4, 1945 |
| 2,451,758 | Malm | Oct. 19, 1948 |
| 2,703,909 | Harwin et al. | Mar. 15, 1955 |
| 2,727,278 | Thompson | Dec. 20, 1955 |
| 2,752,635 | Miller | July 3, 1956 |
| 2,763,028 | Blake | Sept. 18, 1956 |
| 2,894,855 | Wilhelm et al. | July 14, 1959 |

FOREIGN PATENTS

| | | |
|---|---|---|
| 13,575 of 1901 | Great Britain | June 5, 1902 |
| 869,418 | Germany | Mar. 5, 1953 |

OTHER REFERENCES

Noble, Royce J.: Latex in Industry, New York, The Rubber Age, 1936, pages 157–159.

Winspear, George G., (Ed.), The Vanderbilt Latex Handbook, New York, R. T. Vanderbilt Co. Inc., 1954, pages 25–26.